United States Patent
Ajioka et al.

(10) Patent No.: US 12,027,945 B2
(45) Date of Patent: Jul. 2, 2024

(54) ELECTRIC MOTOR

(71) Applicant: Mitsubishi Electric Corporation, Tokyo (JP)

(72) Inventors: Yoshifumi Ajioka, Tokyo (JP); Seiji Haga, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 326 days.

(21) Appl. No.: 17/615,249

(22) PCT Filed: Jun. 5, 2019

(86) PCT No.: PCT/JP2019/022405
§ 371 (c)(1),
(2) Date: Nov. 30, 2021

(87) PCT Pub. No.: WO2020/245958
PCT Pub. Date: Dec. 10, 2020

(65) Prior Publication Data
US 2022/0239184 A1    Jul. 28, 2022

(51) Int. Cl.
*H02K 7/00*    (2006.01)
*H02K 5/20*    (2006.01)
*H02K 7/08*    (2006.01)
*H02K 7/14*    (2006.01)
*H02K 9/06*    (2006.01)

(52) U.S. Cl.
CPC ............. *H02K 5/207* (2021.01); *H02K 7/003* (2013.01); *H02K 7/08* (2013.01); *H02K 7/14* (2013.01); *H02K 9/06* (2013.01)

(58) Field of Classification Search
CPC .. H02K 9/06; H02K 7/14; H02K 7/08; H02K 7/003; H02K 5/207
USPC .......................................................... 310/63
See application file for complete search history.

(56) References Cited

FOREIGN PATENT DOCUMENTS

| JP | S58100463 U | 7/1983 | |
|---|---|---|---|
| JP | 2006025521 | * 1/2006 | ............... H02K 9/06 |
| JP | 2011166908 A | 8/2011 | |
| JP | 2016021815 A | 2/2016 | |
| JP | 2017046377 A | 3/2017 | |

OTHER PUBLICATIONS

Machine translation of JP 2006025521 Kawamichi et al.; Jan. 26, 2006 (Year: 2006).*

(Continued)

*Primary Examiner* — Terrance L Kenerly
(74) *Attorney, Agent, or Firm* — BUCHANAN INGERSOLL & ROONEY PC

(57) ABSTRACT

A frame of an electric motor has inlet holes to allow ambient air to flow into an inside of the motor and outlet holes to allow the ambient air entering through the inlet holes to flow out to an outside of the motor. The motor includes a shaft, a rotor, a stator, a fan to rotate integrally with the shaft, and a guide. The guide is disposed outwardly of the fan in the radial direction and has a shape for suppressing foreign materials contained in the ambient air entering through the inlet holes from coming into contact with the stator and the rotor.

18 Claims, 15 Drawing Sheets

(56) References Cited

OTHER PUBLICATIONS

International Search Report (PCT/ISA/210) with translation and Written Opinion (PCT/ISA/237) mailed on Sep. 3, 2019, by the Japan Patent Office as the International Searching Authority for International Application No. PCT/JP2019/022405. (14 pages).
Office Action dated Dec. 7, 2021, issued in corresponding Japanese Patent Application No. 2021-524581, 8 pages including 4 pages of English translation.

\* cited by examiner

FIG.1
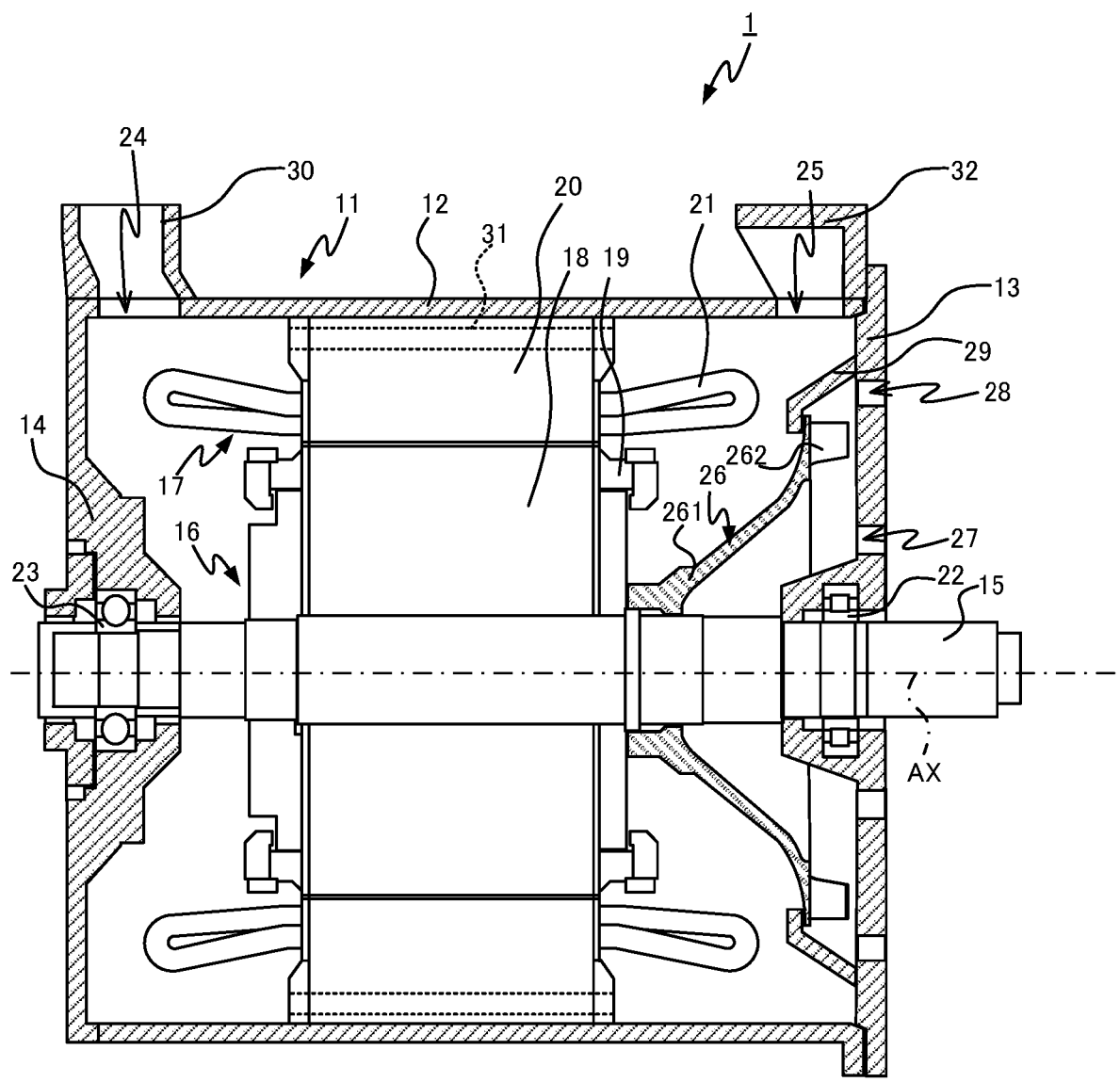
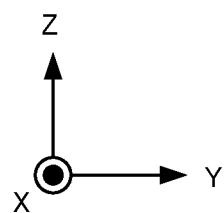

FIG.6
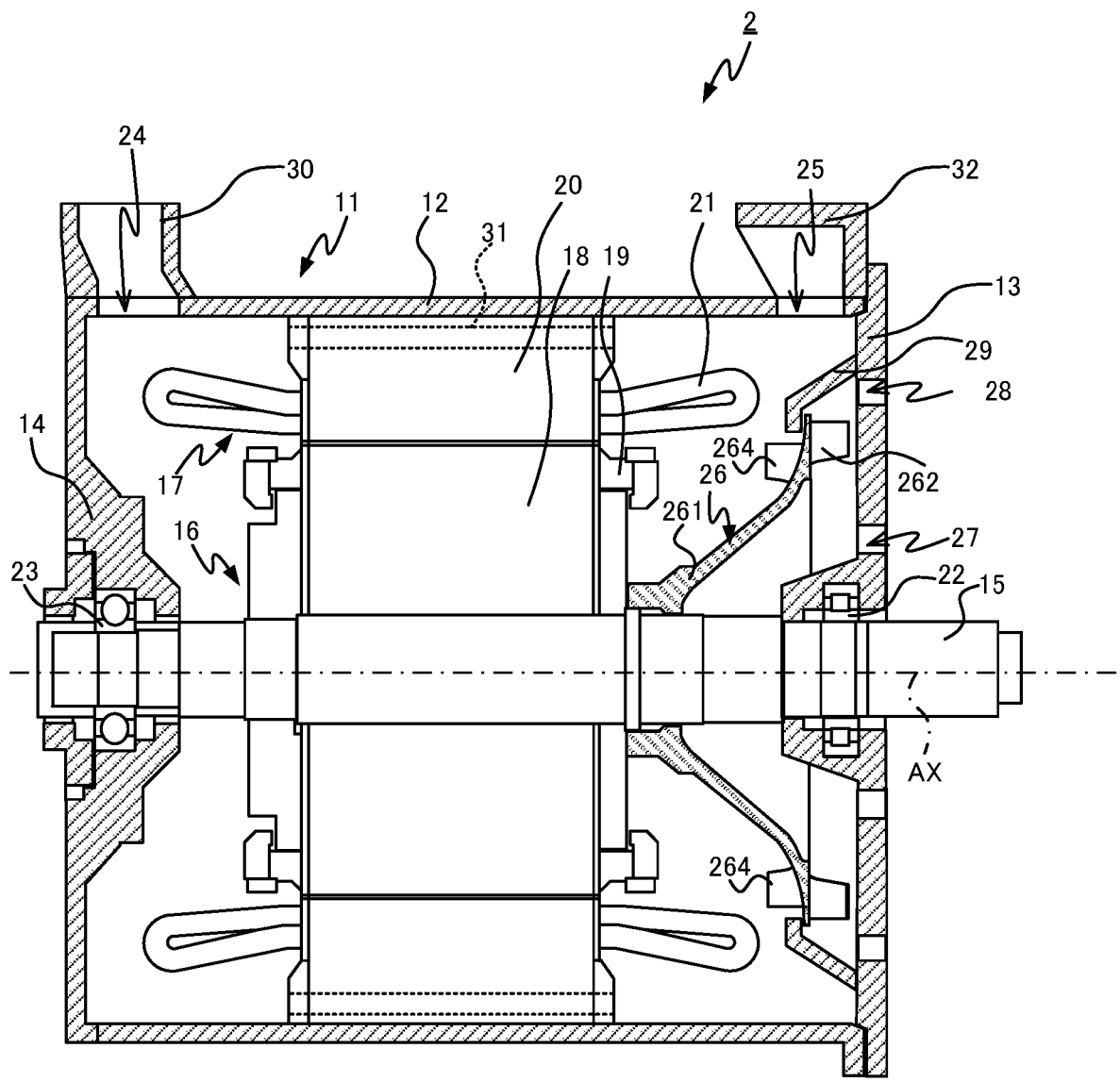
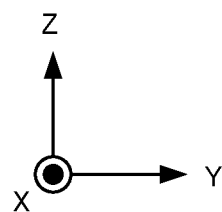

FIG.8
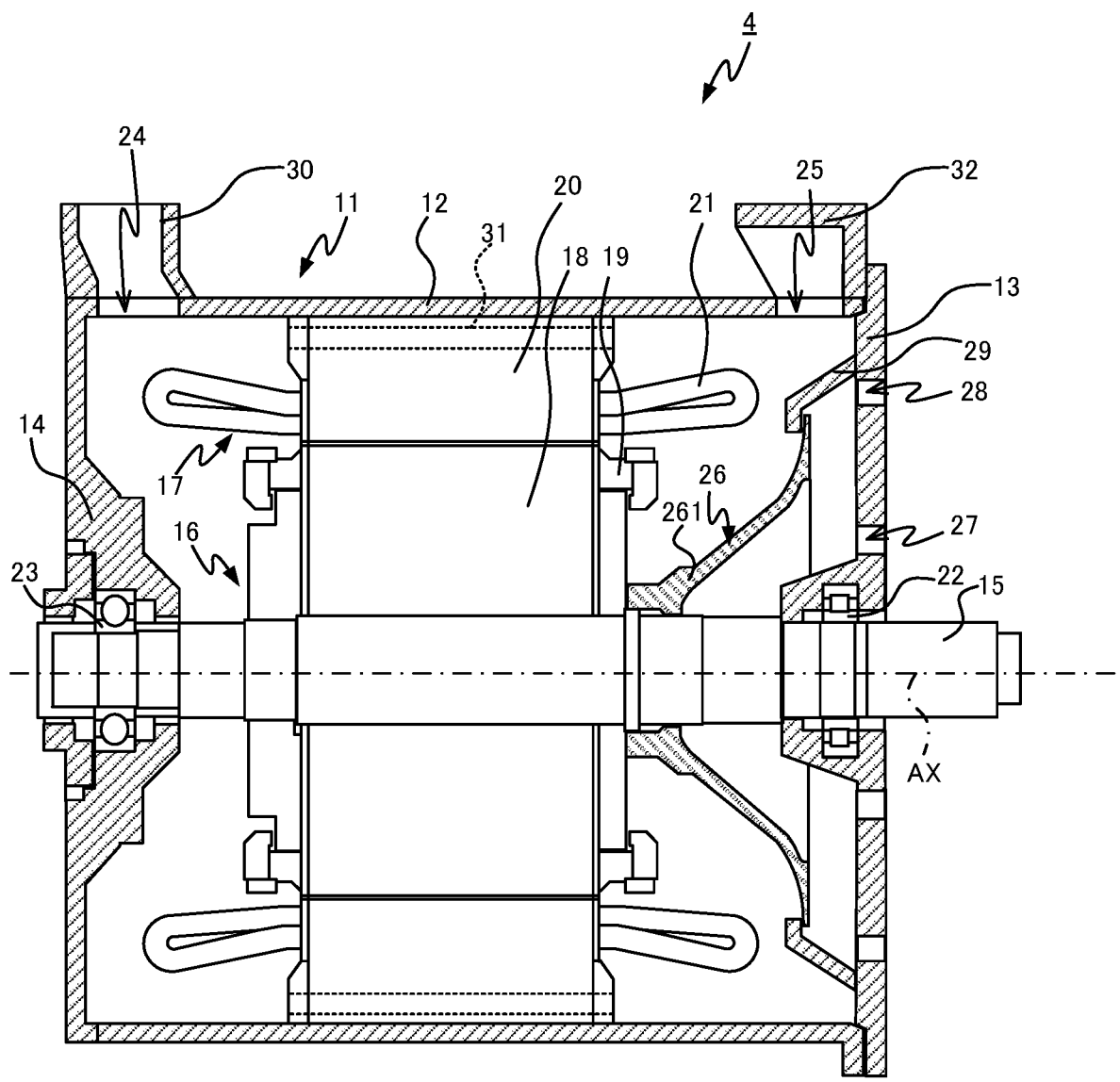
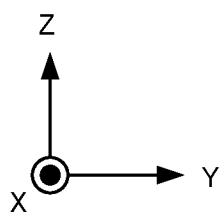

FIG.11
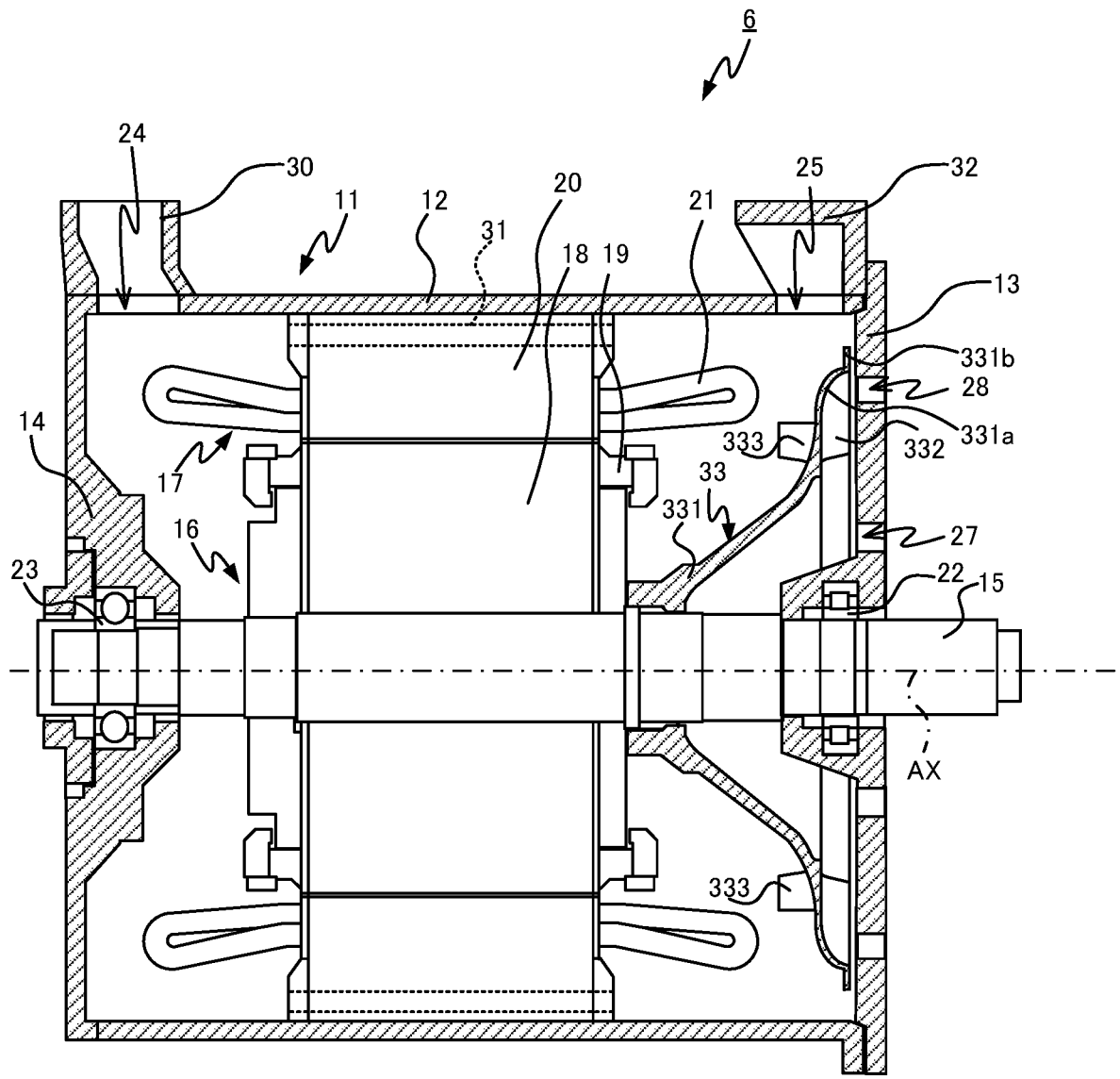
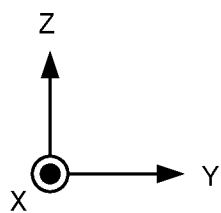

FIG.14
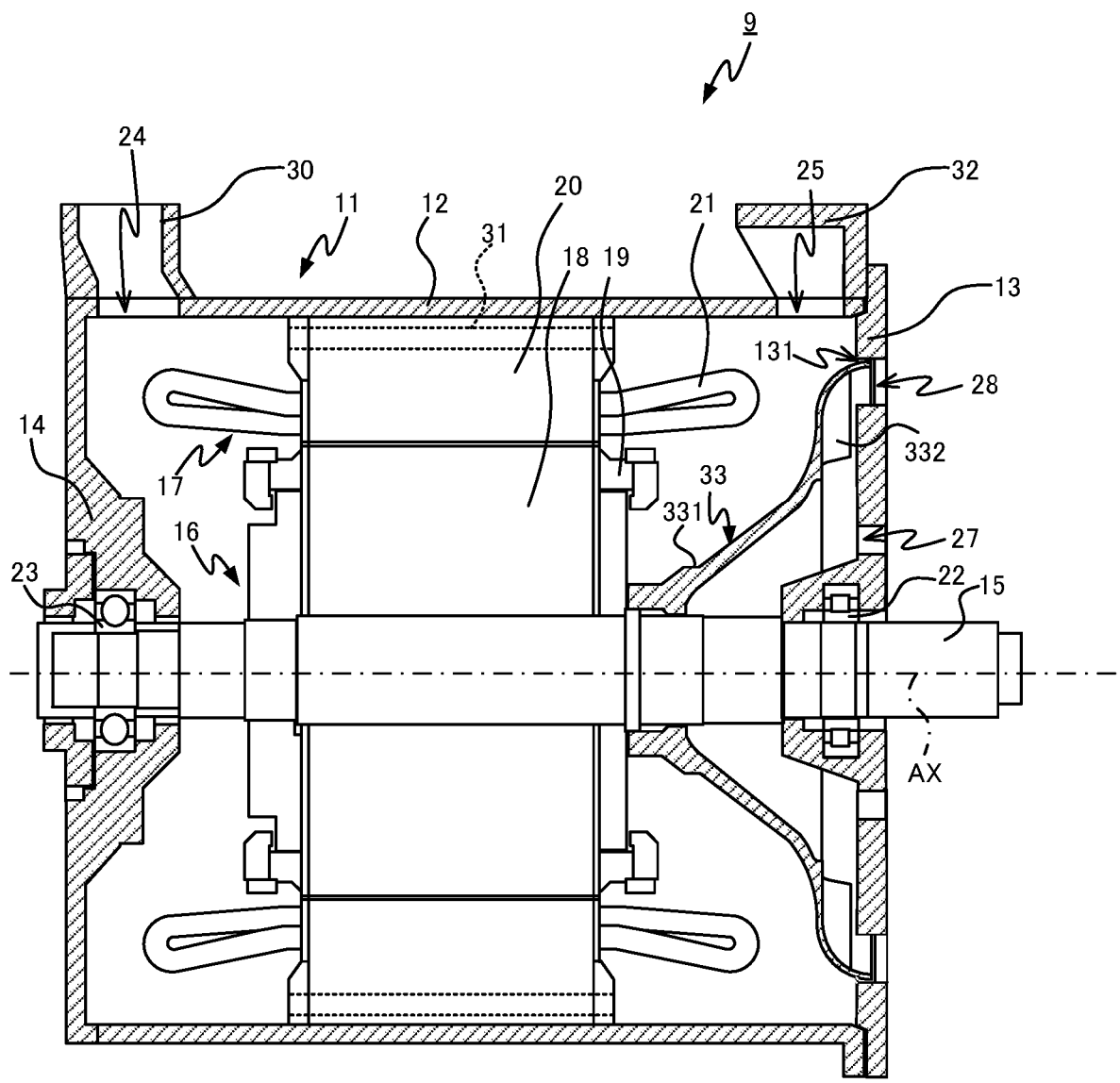
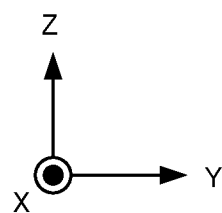

ELECTRIC MOTOR

TECHNICAL FIELD

The present disclosure relates to an electric motor.

BACKGROUND ART

A typical motor includes a shaft, a rotor fixed to the shaft and rotating integrally with the shaft, and a stator facing the rotor with a spacing in the radial direction. The energization of the motor increases the temperatures of a stator core and a stator coil included in the stator, and the temperatures of a rotor core and a rotor conductor included in the rotor. As the temperature of the rotor increases, the temperature of the shaft provided with the rotor also increases. The temperature rise in the shaft leads to an increase in the temperatures of bearings to support the shaft such that the shaft is rotatable, and an increase in the temperature of a lubricant charged in the bearings. The increased temperatures of the bearings and the lubricant cause problematic phenomena, such as variations in the sizes of the spaces inside the bearings, and deterioration of the lubricant.

Some existing techniques have been trying to cool components, such as stator core, stator conductor, rotor core, and rotor conductor, by introducing ambient air from an air-sending device disposed outside the motor to an inside of the motor, and causing the ambient air introduced into the motor to flow via air passages extending through the stator core or the gap between the stator core and the rotor core, for example. The techniques also have been trying to cool bearings by causing ambient air to flow in the vicinity of the bearings in an electric motor including brackets that retain the bearings, one of which brackets has introduction holes and the other of which has discharge holes. The ambient air is introduced by the rotation of a fan fixed to the shaft via the introduction holes of the bracket into the motor. A typical motor of this type is disclosed in Patent Literature 1. In the motor disclosed in Patent Literature 1, a frame has an introduction hole on the side surface, and a bracket that faces a fan has an introduction hole, a first discharge hole, and a second discharge hole adjacent to the first discharge hole. The ambient air is fed from an air-sending device disposed outside the motor, enters the motor via the introduction hole of the side surface of the frame, and exits the motor via the first discharge hole of the bracket. The rotation of the fan fixed to the shaft causes the ambient air entering the motor via the introduction hole of the bracket to exit the motor via the second discharge hole. This configuration can cool bearings as well as the stator core, the stator conductor, the rotor core, and the rotor conductor.

CITATION LIST

Patent Literature

Patent Literature 1: Unexamined Japanese Patent Application Publication No. 2017-046377

SUMMARY OF INVENTION

Technical Problem

The ambient air entering the motor via the introduction hole of the bracket contains foreign materials, such as dust and water. In the motor disclosed in Patent Literature 1, the ambient air entering via the introduction hole of the bracket may flow in the opposite direction without exiting via the second discharge hole and may come into contact with the components, such as the stator conductor and the rotor conductor. The contact of the ambient air containing foreign materials with the components, such as the stator conductor and the rotor conductor, may cause a failure in the motor. This problem may also occur in an outer-rotor motor, although the motor disclosed in Patent Literature 1 is an inner-rotor motor.

An objective of the present disclosure, which has been accomplished in view of the above situations, is to provide an electric motor less susceptible to failures caused by foreign materials contained in the ambient air and capable of cooling the components inside the motor.

Solution to Problem

In order to achieve the above objective, an electric motor according to an aspect of the present disclosure includes a shaft, a rotor, a stator, bearings, a fan, a frame, and a guide. The shaft is supported to be rotatable about a rotational axis. The rotor is disposed outwardly of the shaft in the radial direction, and rotates integrally with the shaft. The stator faces the rotor with a spacing therebetween in the radial direction. The bearings support the shaft such that the shaft is rotatable. The fan rotates integrally with the shaft. The frame has a shape of a cylinder having closed ends, accommodates the rotor, the stator, and the fan, and retains the bearings. The guide is disposed outwardly of the fan in the radial direction. The frame has inlet holes and outlet holes. The inlet holes are disposed in the surface facing the fan in the direction of the rotational axis to allow ambient air to flow into an inside of the electric motor. The outlet holes are disposed outwardly of the inlet holes in the radial direction in the surface facing the fan in the direction of the rotational axis, to allow the ambient air entering through the inlet holes to flow out to an outside of the electric motor. The guide has a shape for suppressing foreign materials contained in the ambient air entering through the inlet holes from coming into contact with the stator and the rotor.

Advantageous Effects of Invention

According to an aspect of the present disclosure, the ambient air entering the motor through the inlet holes disposed in the surface facing the fan in the direction of the rotational axis is discharged through the outlet holes disposed outwardly of the inlet holes in the radial direction, thereby cooling the components inside the motor. The motor includes the guide having a shape for suppressing foreign materials contained in the ambient air entering through the inlet holes from coming into contact with the stator and the rotor, and is therefore less susceptible to failures caused by foreign materials contained in the ambient air entering through the inlet holes.

BRIEF DESCRIPTION OF DRAWINGS

FIG. 1 is a cross-sectional view of an electric motor according to Embodiment 1 of the present disclosure;

FIG. 6 is a cross-sectional view of an electric motor according to Embodiment 2 of the present disclosure;

FIG. 8 is a cross-sectional view of an electric motor according to Embodiment 4 of the present disclosure;

FIG. 11 is a cross-sectional view of an electric motor according to Embodiment 6 of the present disclosure;

FIG. 14 is a cross-sectional view of an electric motor according to Embodiment 9 of the present disclosure.

DESCRIPTION OF EMBODIMENTS

Figure 2:
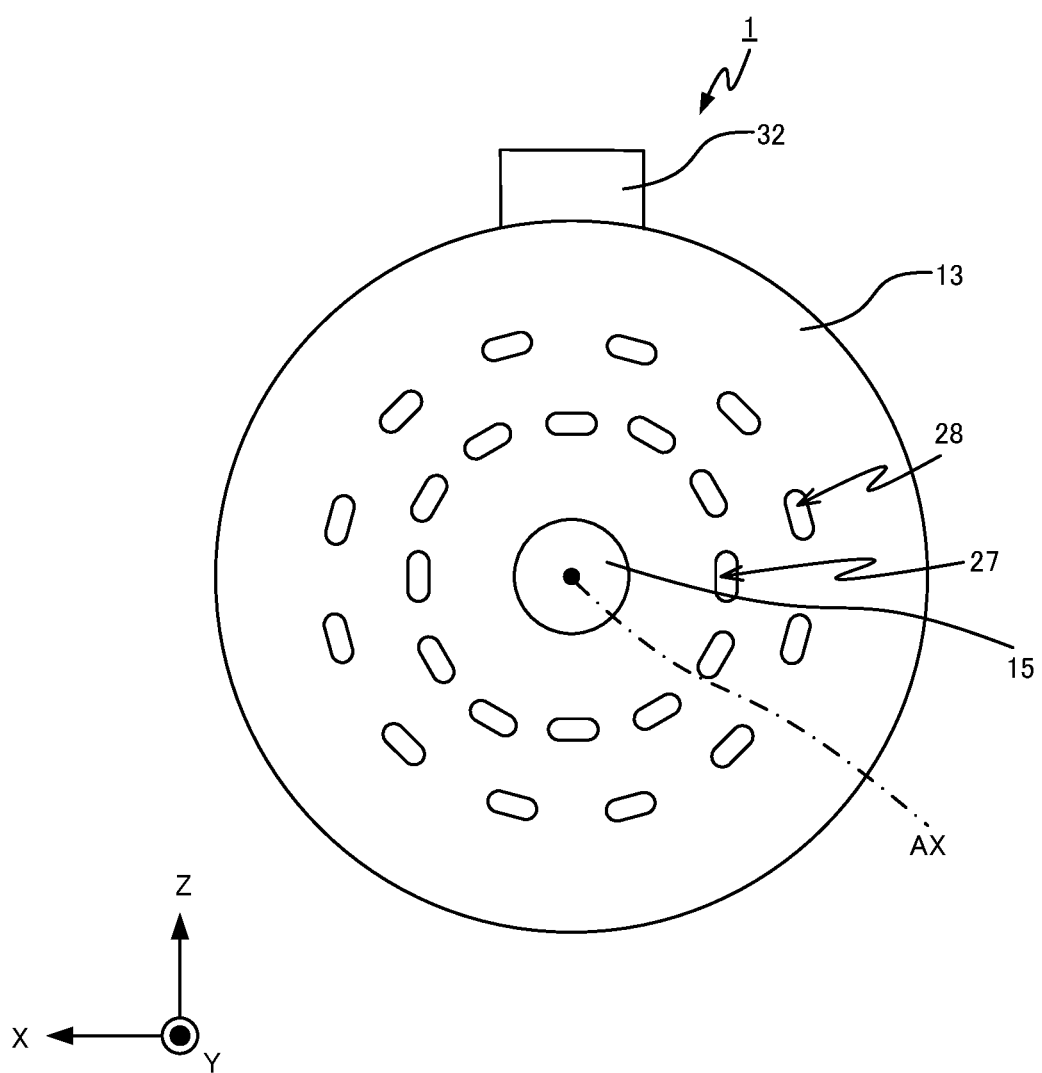
FIG. 2 is a side view of the motor according to Embodiment 1.

An electric motor according to embodiments of the present disclosure is described in detail below with reference to the accompanying drawings. In the drawings, the components identical or corresponding to each other are provided with the same reference symbol.

Embodiment 1

An electric motor according to Embodiment 1 is described below focusing on an exemplary motor used to drive a railway vehicle. FIG. 1 illustrates the motor according to Embodiment 1. An electric motor 1 illustrated in FIG. 1 includes a frame 11, a shaft 15 accommodated in the frame 11, a rotor 16 to rotate integrally with the shaft 15, and a stator 17 mounted on the frame 11. In FIG. 1, the Z axis corresponds to the vertical direction, the Y axis is parallel to a rotational axis AX of the shaft 15, and the X axis is orthogonal to the Y and Z axes. The rotational axis AX is represented by the dashed and single-dotted line in FIG. 1. Since the motor 1 is used to drive the railway vehicle, the frame 11 is fixed to the bogie of the railway vehicle, and one end of the shaft 15 is coupled to the axle of the railway vehicle via joints and gears. The frame 11 includes a stator frame 12 having a cylindrical shape and brackets 13 and 14 that close both ends of the stator frame 12 in the Y-axis direction. The rotor 16 is disposed outwardly of the shaft 15 in the radial direction. The rotor 16 includes a rotor core 18 engaging with the shaft 15, and a rotor conductor 19 inserted in a groove on the outer periphery of the rotor core 18. The stator 17 includes a stator core 20 mounted on the stator frame 12 of the frame 11, and a stator conductor 21 inserted in a groove on the stator core 20. The outer periphery of the rotor core 18 and the inner periphery of the stator core 20 face each other while being spaced from each other. The motor 1 further includes bearings 22 and 23 to support the shaft 15 such that the shaft 15 is rotatable. The bearing 22 is retained by the bracket 13, while the bearing 23 is retained by the bracket 14. The end of the shaft 15 adjacent to the bracket 13 is coupled to the axle of the railway vehicle via joints and gears, which are not illustrated, so that the rotation of the shaft 15 drives the railway vehicle. The end of the shaft 15 coupled to the axle is called the inboard end, while the other end is called the outboard end.

In order to cool the rotor 16 and the stator 17, the frame 11 has an inlet opening 24 to allow ambient air to flow into an inside of the motor 1, and an outlet opening 25 to allow the ambient air entering through the inlet opening 24 to flow out to an outside of the motor 1. In detail, the inlet opening 24 and the outlet opening 25 are disposed in a portion of the stator frame 12 of the frame 11 including the top end in the Z-axis direction. The inlet opening 24 is provided with a duct 30 therearound, so that the air fed from an air-sending device, which is not illustrated, disposed outside the motor 1 flows through the duct 30 into the motor 1 via the inlet opening 24. The outlet opening 25 is provided with a cover 32 to suppress foreign materials, such as dust, rain, and snow, which fall in the vertical direction from entering the motor 1. The stator core 20 has air passages 31 that extends through the stator core 20 from one to the other ends in the direction of the rotational axis AX, and thereby allows the ambient air entering via the inlet opening 24 to flow inside the motor 1.

In order to cool the bearing 22, the bracket 13 has inlet holes 27 to allow ambient air to flow into an inside of the motor 1, and outlet holes 28 to allow the ambient air entering through the inlet holes 27 to flow out to an outside of the motor 1. As illustrated in FIG. 2, which is a view of the motor 1 as seen toward the negative side in the Y-axis direction, the inlet holes 27 are disposed around the rotational axis AX while being spaced in the circumferential direction. The outlet holes 28 are also disposed around the rotational axis AX while being spaced in the circumferential direction.

Figure 3:
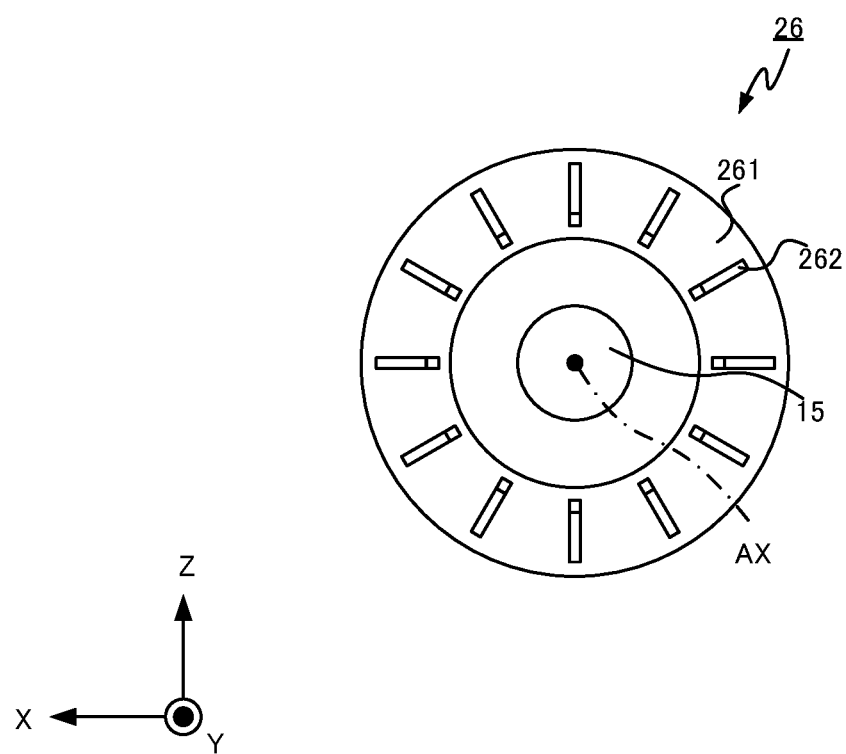
FIG. 3 is a side view of a fan according to Embodiment 1.

The motor 1 further includes a fan 26 to rotate integrally with the shaft 15, in order to introduce ambient air via the inlet holes 27. The fan 26 includes a primary blade 261 mounted on the shaft 15 and having a circular profile in a section orthogonal to the rotational axis AX, and secondary blades 262 extending from the primary blade 261. The diameter of the primary blade 261 in a section orthogonal to the rotational axis AX increases as the section approaches the bracket 13. As illustrated in FIG. 3, which is a view of the fan 26 mounted on the shaft 15 as seen toward the negative side in the Y-axis direction, the primary blade 261 is provided with a plurality of secondary blades 262 spaced from each other in the circumferential direction. The secondary blades 262 extend from the primary blade 261 in the direction toward the bracket 13.

The inlet holes 27 are closer to the ground and to the wheels of the railway vehicle than the inlet opening 24. The ambient air entering through the inlet holes 27 thus may contain foreign materials, such as dust and water, splashed during running of the railway vehicle, and tends to contain more foreign materials than those of the ambient air entering through the inlet opening 24. In order to suppress the ambient air entering through the inlet holes 27 containing more foreign materials from coming into contact with the components, such as the rotor conductor 19 and the stator conductor 21, and thereby causing a trouble in the motor 1, the motor 1 further includes a guide 29 disposed outwardly of the fan 26 in the radial direction and having a shape for suppressing the ambient air entering through the inlet holes 27 from coming into contact with the stator 17 and the rotor 16. The guide 29 is mounted on the bracket 13, extends toward the edge of the fan 26 in the radial direction, and has a shape for suppressing the ambient air entering through the inlet holes 27 from flowing through the gap between the fan 26 and the guide 29.

Figure 4:
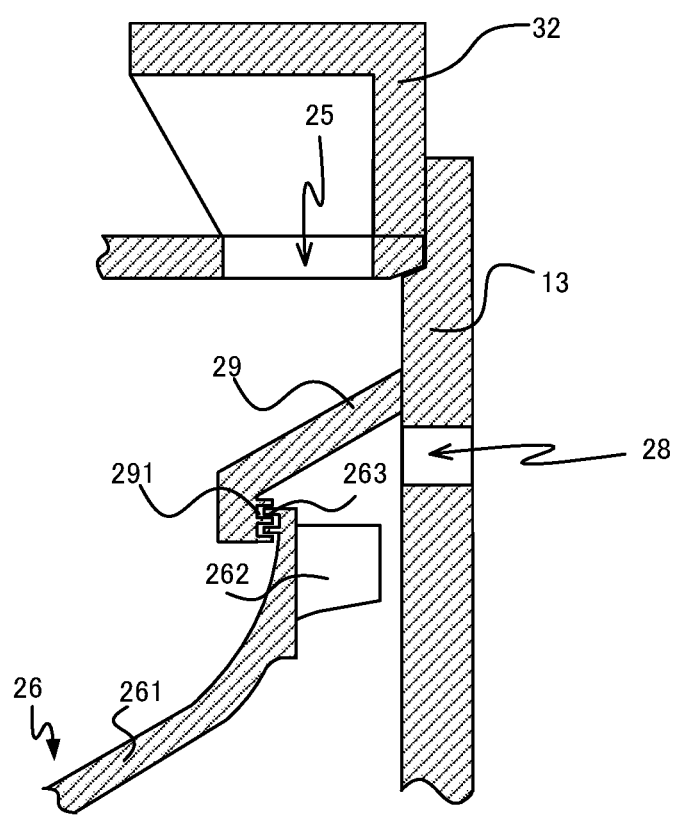
FIG. 4 is a partial cross-sectional view of the motor according to Embodiment 1.

The guide 29 and the fan 26 are shaped to define a labyrinth channel therebetween so as to suppress the ambient air entering through the inlet holes 27 from flowing through the gap between the guide 29 and the fan 26 and coming into contact with the components, such as the rotor conductor 19 and the stator conductor 21. In detail, as illustrated in FIG. 4, the edge of the guide 29 that faces the fan 26 has a first uneven portion 291 including annular recesses recessed in the direction of the rotational axis AX and extending around the central axis coinciding with the rotational axis AX, and annular protrusions protruding in the direction of the rotational axis AX and extending around the central axis coinciding with the rotational axis AX. The annular recesses and the annular protrusions of the first uneven portion 291 are alternately arranged in the radial direction. The edge of the fan 26 in the radial direction that faces the guide 29 has a second uneven portion 263 including annular recesses recessed in the direction of the rotational axis AX and extending around the central axis coinciding with the rotational axis AX, and annular protrusions protruding in the direction of the rotational axis AX and extending around the central axis coinciding with the rotational axis AX. The annular recesses and the annular protrusions of the second uneven portion 263 are alternately arranged in the radial direction. The first uneven portion 291 and the second uneven portion 263 face each other in the direction of the rotational axis AX and thereby define a labyrinth channel therebetween. The above-described structures of the guide 29 and the fan 26 allow the fan 26 to rotate integrally with the shaft 15 and define a labyrinth channel between the guide 29 and the fan 26. For example, the recesses in the first uneven portion 291 and the protrusions in the second uneven portion 263 face each other with a spacing of less than 10 millimeters in the direction of the rotational axis AX, while the protrusions in the first uneven portion 291 and the recesses in the second uneven portion 263 face each other with a spacing of less than 10 millimeters in the direction of the rotational axis AX.

Figure 5:
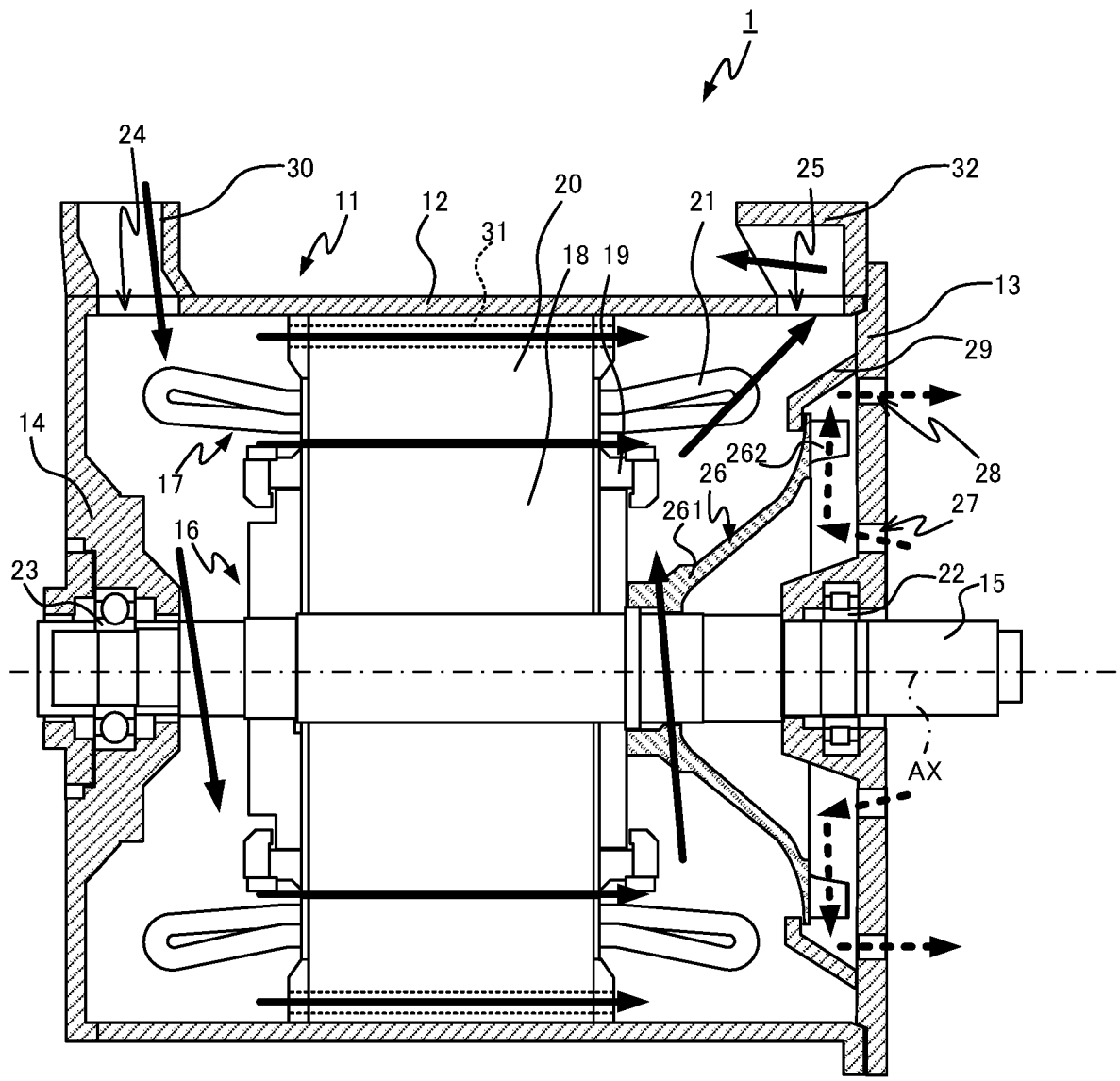
FIG. 5 illustrates flows of ambient air in the motor according to Embodiment 1.

The energization of the motor 1 having the above configuration increases the temperatures of the stator core 20, the stator conductor 21, the rotor core 18, and the rotor conductor 19. According to the temperature rises, the temperatures of the shaft 15 and the bearings 22 and 23 also increase. As represented by the solid-line arrows in FIG. 5, the air fed from the air-sending device disposed outside the motor 1 is introduced via the inlet opening 24, flows through the air passages 31 or the gap between the rotor 16 and the stator 17, and is discharged via the outlet opening 25. The air fed from the air-sending device flows inside the motor 1 and can thereby cool the components inside the motor 1.

When the rotor core 18 and the shaft 15 rotate integrally in response to energization of the motor 1, the fan 26 rotates integrally with the shaft 15, thereby introducing the air outside the motor 1 via the inlet holes 27. As represented by the dashed-line arrows in FIG. 5, the ambient air entering through the inlet holes 27 flows in the vicinity of the bearing 22, flows outward in the radial direction, and is discharged via the outlet holes 28. The ambient air entering through the inlet holes 27 flows in the vicinity of the bearing 22 and can thereby cool the bearing 22.

As described above, the frame 11 of the motor 1 according to Embodiment 1 has the inlet holes 27 and the outlet holes 28 as well as the inlet opening 24 and the outlet opening 25. The ambient air fed from the air-sending device and entering the motor 1 via the inlet opening 24 flows through the air passages 31 or the gap between the rotor 16 and the stator 17, and exits the motor 1 via the outlet opening 25. The ambient air entering the motor 1 through the inlet holes 27 flows in the vicinity of the bearing 22, flows outward in the radial direction along the fan 26 and the guide 29, and exits the motor 1 through the outlet holes 28. These flows of ambient air can cool the components inside the motor 1. In addition, the guide 29 can suppress foreign materials contained in the ambient air entering the motor 1 through the inlet holes 27 from coming into contact with the components, such as the rotor conductor 19 and the stator conductor 21. The motor 1 is therefore less susceptible to failures caused by foreign materials coming into contact with the components, such as the rotor conductor 19 and the stator conductor 21. The motor 1 does not require an external component, such as filter or cover, for blocking foreign materials over the inlet holes 27, and therefore has a sufficiently small size.

Embodiment 2

The fan 26 may have any shape that facilitates introduction of ambient air via the inlet holes 27. The following description is directed to an example as Embodiment 2 in which both surfaces of the primary blade 261 of the fan 26 are provided with secondary blades. The fan 26 of an electric motor 2 according to Embodiment 2 illustrated in FIG. 6 further includes secondary blades 264 extending from the primary blade 261 in the direction away from the bracket 13, in addition to the configuration of the fan 26 of the motor 1 according to Embodiment 1.

The ambient air fed from the air-sending device, entering the motor 2 through the inlet opening 24, and flowing through the air passages 31 or the gap between the rotor 16 and the stator 17, is delivered outward in the radial direction due to the rotation of the fan 26 including the secondary blades 264. The ambient air can therefore exit the motor 2 smoothly through the outlet opening 25.

As described above, the fan 26 of the motor 2 according to Embodiment 2 has the secondary blades 264 in addition to the secondary blades 262, and can thus facilitate discharge of ambient air through the outlet opening 25. The ambient air in the motor 2 can therefore flow smoothly, leading to the higher cooling efficiency inside the motor 2 than that inside the motor 1.

Embodiment 3

Figure 7:
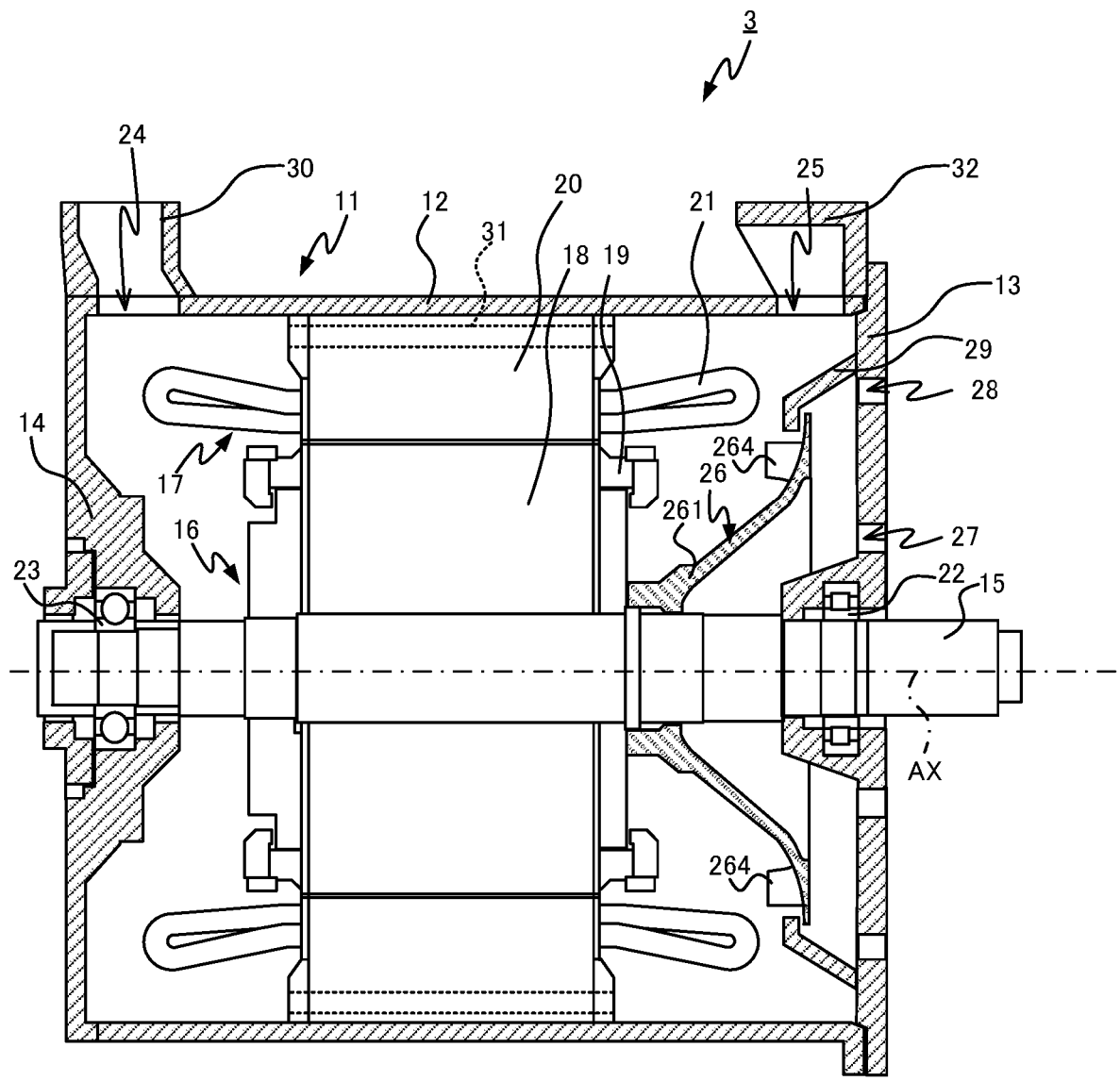
FIG. 7 is a cross-sectional view of an electric motor according to Embodiment 3 of the present disclosure.

The following description is directed to another exemplary shape of the fan 26 as Embodiment 3 in which only one of the surfaces of the primary blade 261 of the fan 26 that faces the stator 17 is provided with secondary blades. The fan 26 of an electric motor 3 according to Embodiment 3 illustrated in FIG. 7 includes the primary blade 261 as in Embodiments 1 and 2, and the secondary blades 264 as in Embodiment 2. The surface of the primary blade 261 that faces the bracket 13 is not provided with a secondary blade. The rotation of the primary blade 261 causes ambient air to enter the motor 3 through the inlet holes 27, flow along the fan 26 and the guide 29, and exit the motor 3 through the outlet holes 28. Because of no secondary blade on the surface of the primary blade 261 that faces the bracket 13, the motor 3 can reduce wind noise to leak from the motor 3 through the inlet holes 27 and the outlet holes 28.

As described above, the primary blade 261 of the fan 26 of the motor 3 according to Embodiment 3 is provided with the secondary blades 264 extending in the direction away from the bracket 13. Since the fan 26 includes no secondary blade on the surface of the primary blade 261 that faces the bracket 13, the motor 3 can reduce wind noise to leak from the motor 3 through the inlet holes 27 and the outlet holes 28.

This configuration can make the motor 3 quieter.

Embodiment 4

The following description is directed to another exemplary shape of the fan 26 as Embodiment 4 in which no secondary blade is provided on the primary blade 261 of the fan 26. The fan 26 of an electric motor 4 according to Embodiment 4 illustrated in FIG. 8 includes the primary blade 261 as in Embodiments 1 to 3, but no secondary blade is provided on the primary blade 261. Because of no secondary blade on both main surfaces of the primary blade 261, the motor 4 can reduce not only wind noise to leak from the motor 4 through the inlet holes 27 and the outlet holes 28 but also wind noise to leak from the motor 4 through the outlet opening 25.

As described above, since the fan 26 of the motor 4 according to Embodiment 4 includes no secondary blade on both main surfaces of the primary blade 261, the motor 4 can reduce not only wind noise to leak from the motor 4 through the inlet holes 27 and the outlet holes 28 but also wind noise to leak from the motor 4 through the outlet opening 25. This configuration can make the motor 4 quieter.

Embodiment 5

Figure 9:
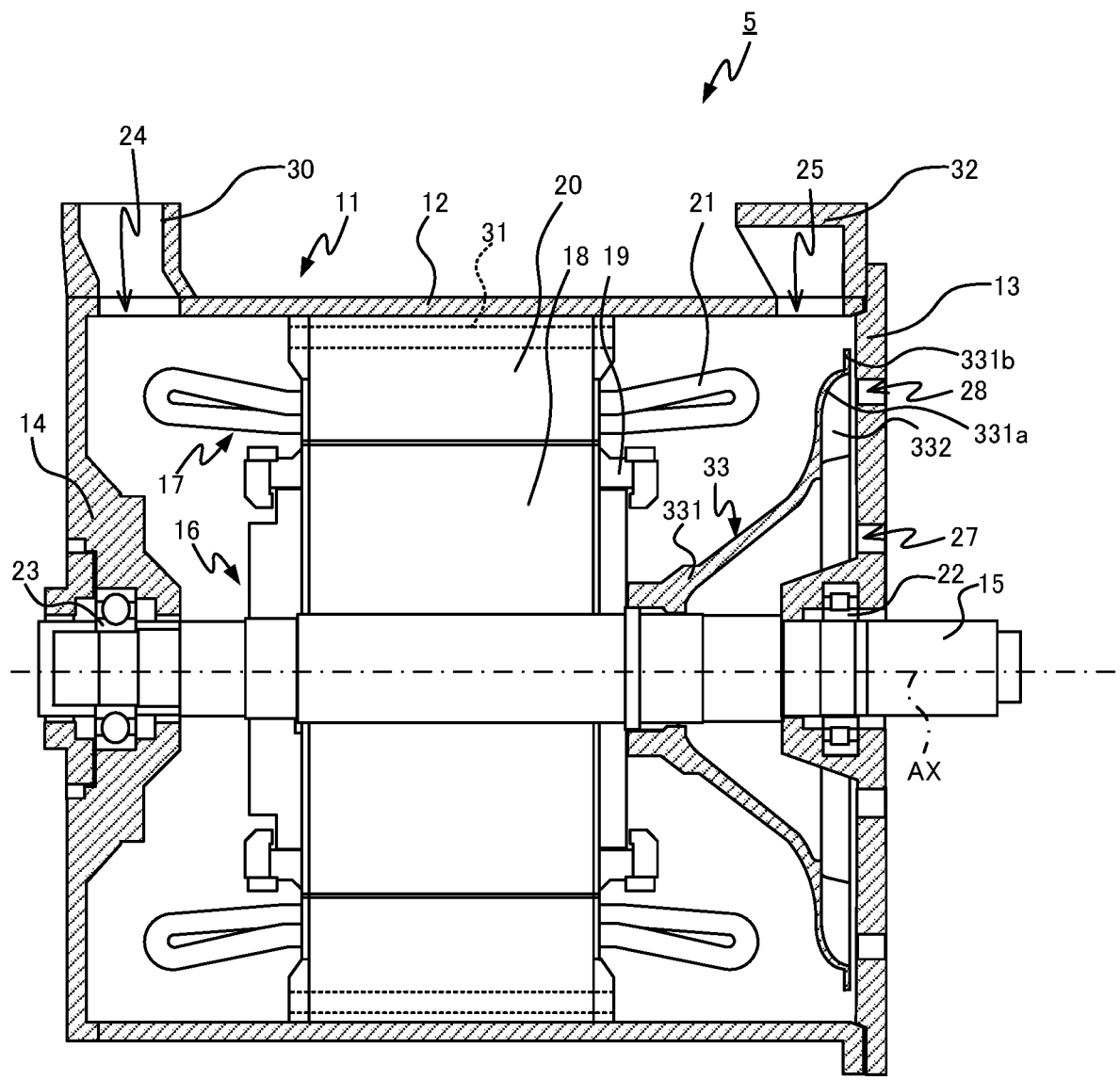
FIG. 9 is a cross-sectional view of an electric motor according to Embodiment 5 of the present disclosure.

The motor may exclude the guide when another component performs the functions of the guide. The following description is directed to an example as Embodiment 5 in which the fan performs the functions of the guide. An electric motor 5 according to Embodiment 5 illustrated in FIG. 9 excludes the guide, and includes a fan 33 integrated with a guide, instead of the fan 26 of the motor 1 according to Embodiment 1. The fan 33 includes a primary blade 331 mounted on the shaft 15 and having a circular profile in a section orthogonal to the rotational axis AX, and secondary blades 332 extending from the primary blade 331.

Figure 10:
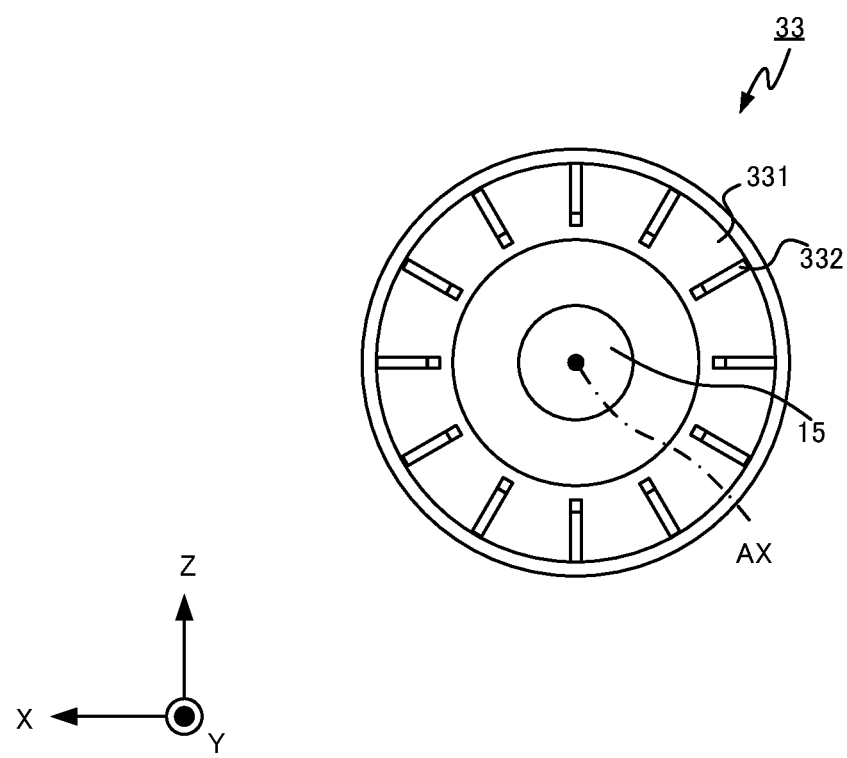
FIG. 10 is a side view of a fan according to Embodiment 5.

The primary blade 331 has a shape for suppressing the ambient air entering through the inlet holes 27 from coming into contact with the stator 17 and the rotor 16. Specifically, the diameter of the primary blade 331 in a section orthogonal to the rotational axis AX increases as the section approaches the bracket 13. The primary blade 331 has a curved portion 331a swelling outward in the radial direction, and an edge portion 331b continuous to the curved portion 331a and extending along the bracket 13. The curved portion 331a guides the ambient air entering through the inlet holes 27 to the outlet holes 28. The edge portion 331b is located adjacent to the bracket 13. Specifically, the edge portion 331b is located adjacent to the bracket 13 such that the configuration can suppress the ambient air entering through the inlet holes 27 from flowing through the gap between the edge portion 331b and the bracket 13 and coming into contact with the components, such as the rotor conductor 19 and the stator conductor 21. The spacing between the edge portion 331b and the bracket 13 is preferably less than 5 millimeters. As illustrated in FIG. 10, which is a view of the fan 33 as seen toward the negative side in the Y-axis direction, the primary blade 331 is provided with a plurality of secondary blades 332 spaced from each other in the circumferential direction. The secondary blades 332 extend from the primary blade 331 in the direction toward the bracket 13.

The fan 33 expands outward in the radial direction, and the edge of the fan 33 in the radial direction is located adjacent to the bracket 13. For example, the edge of the fan 33 in the radial direction and the bracket 13 face each other with a spacing of less than 10 millimeters in the direction of the rotational axis AX.

The fan 33 rotates integrally with the shaft 15 in response to energization of the motor 5 having the above configuration, thereby introducing the air outside the motor 5 into the motor 5 via the inlet holes 27. The ambient air entering through the inlet holes 27 flows in the vicinity of the bearing 22, flows outward in the radial direction along the fan 33, and exits the motor 5 through the outlet holes 28. The ambient air entering through the inlet holes 27 flows in the vicinity of the bearing 22 and can thereby cool the bearing 22.

As described above, the components inside the motor 5 according to Embodiment 5 are cooled by flows of the ambient air entering the motor 5 through the inlet opening 24 or the inlet holes 27. Since the edge of the fan 33 in the radial direction is located adjacent to the bracket 13, the configuration can suppress foreign materials contained in the ambient air entering the motor 5 through the inlet holes 27 from coming into contact with the components, such as the rotor conductor 19 and the stator conductor 21. The motor 5 is therefore less susceptible to failures caused by foreign materials coming into contact with the components, such as the rotor conductor 19 and the stator conductor 21. The motor 5 does not require an external component, such as filter or cover, for blocking foreign materials over the inlet holes 27, and therefore has a sufficiently small size.

Embodiment 6

The fan 33 may have any shape that facilitates introduction of ambient air through the inlet holes 27 and suppress foreign materials contained in the ambient air from coming into contact with the components, such as the rotor conductor 19 and the stator conductor 21. The following description is directed to an example as Embodiment 6 in which both surfaces of the primary blade 331 of the fan 33 are provided with secondary blades. The fan 33 of an electric motor 6 according to Embodiment 6 illustrated in FIG. 11 further includes secondary blades 333 extending from the primary blade 331 in the direction away from the bracket 13, in addition to the configuration of the fan 33 of the motor 5 according to Embodiment 5.

The ambient air fed from the air-sending device, entering the motor 6 through the inlet opening 24, and flowing through the air passages 31 or the gap between the rotor 16 and the stator 17, is delivered outward in the radial direction due to the rotation of the fan 33 including the secondary blades 333. The ambient air can therefore exit the motor 6 smoothly through the outlet opening 25.

As described above, the fan 33 of the motor 6 according to Embodiment 6 includes the secondary blades 333 in addition to the secondary blades 332, and can thus facilitate discharge of ambient air through the outlet opening 25. The ambient air in the motor 6 can therefore flow smoothly, leading to the higher cooling efficiency inside the motor 6 than that inside the motor 5.

Embodiment 7

Figure 12:
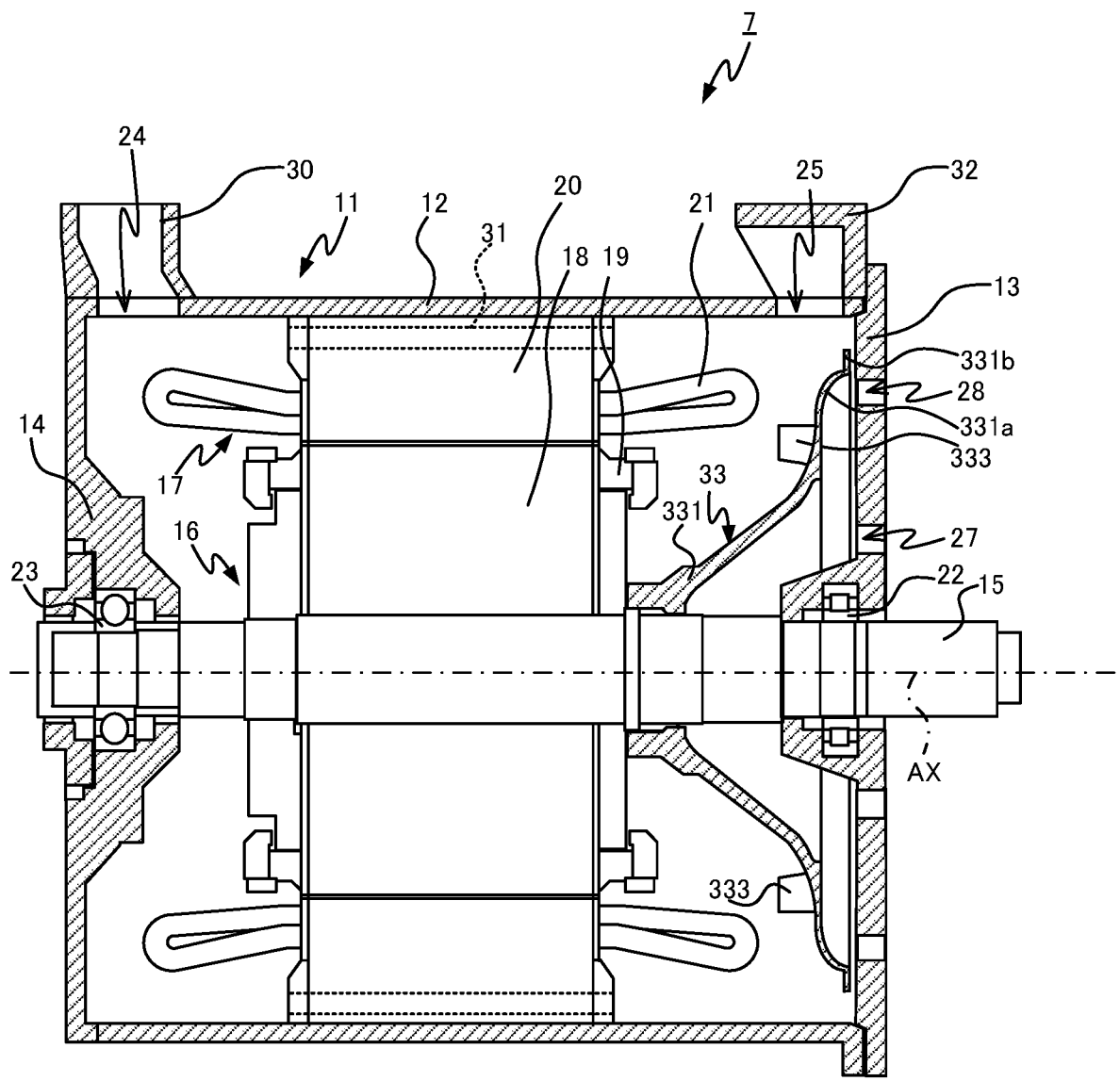
FIG. 12 is a cross-sectional view of an electric motor according to Embodiment 7 of the present disclosure.

The following description is directed to another exemplary shape of the fan 33 as Embodiment 7 in which only one of the surfaces of the primary blade 331 of the fan 33 that faces the stator 17 is provided with secondary blades. The fan 33 of an electric motor 7 according to Embodiment 7 illustrated in FIG. 12 includes the primary blade 331 as in Embodiments 5 and 6, and the secondary blades 333 as in Embodiment 6. The surface of the primary blade 331 that faces the bracket 13 is not provided with a secondary blade. The rotation of the primary blade 331 causes ambient air to enter the motor 7 through the inlet holes 27, flow along the fan 33, and exit the motor 7 through the outlet holes 28. Because of no secondary blade on the surface of the primary blade 331 that faces the bracket 13, the motor 7 can reduce wind noise to leak from the motor 7 via the inlet holes 27 and the outlet holes 28.

As described above, the primary blade 331 of the fan 33 of the motor 7 according to Embodiment 7 is provided with the secondary blades 333 extending in the direction away from the bracket 13. Since the fan 33 includes no secondary blade on the surface of the primary blade 331 that faces the bracket 13, the motor 7 can reduce wind noise to leak from the motor 7 via the inlet holes 27 and the outlet holes 28. This configuration can make the motor 7 quieter.

Embodiment 8

Figure 13:
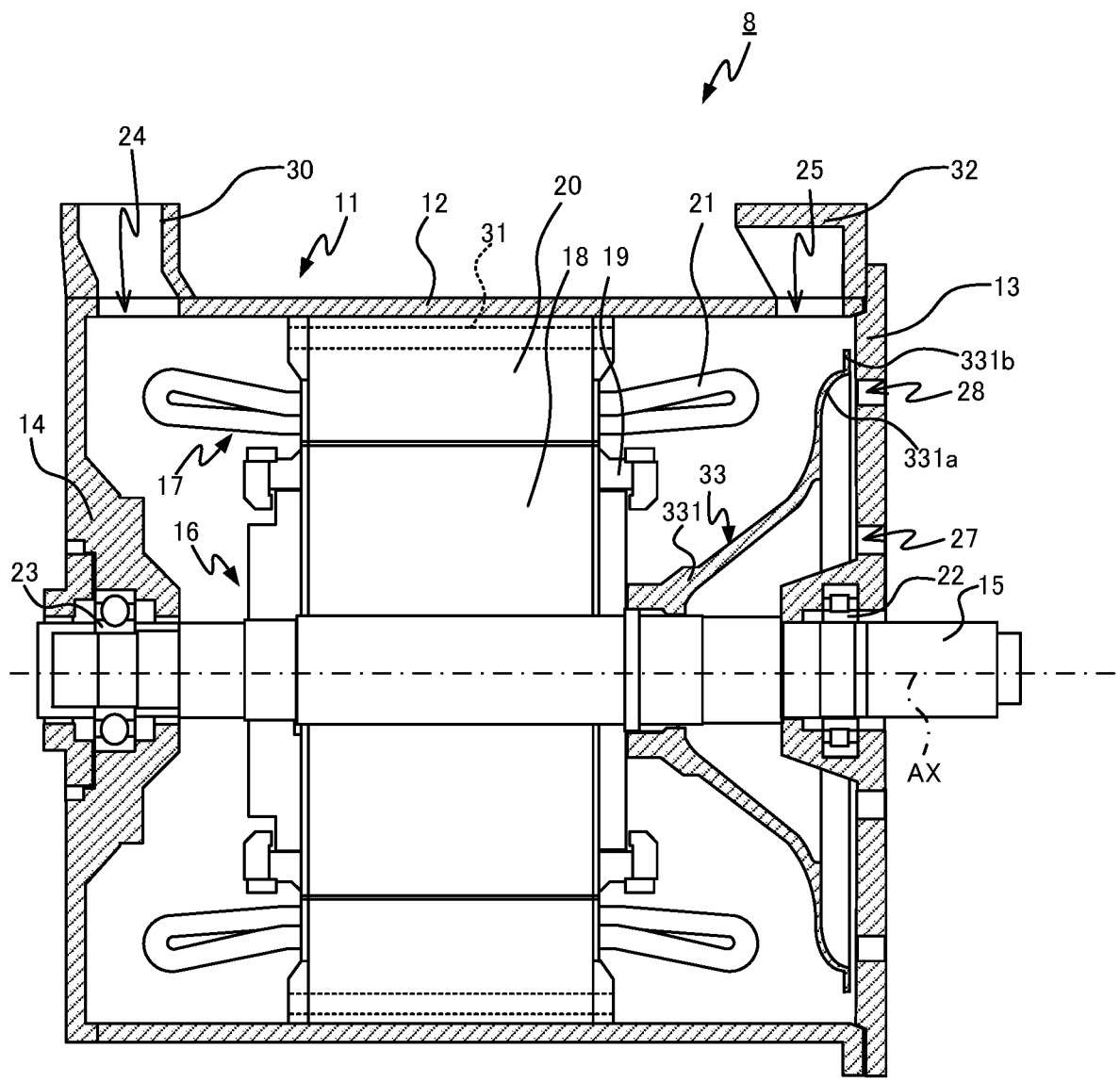
FIG. 13 is a cross-sectional view of an electric motor according to Embodiment 8 of the present disclosure.

The following description is directed to another exemplary shape of the fan 33 as Embodiment 8 in which no secondary blade is provided on the primary blade 331 of the fan 33. The fan 33 of an electric motor 8 according to Embodiment 8 illustrated in FIG. 13 includes the primary blade 331 as in Embodiments 5 to 7, but no secondary blade is provided on the primary blade 331. Because of no secondary blade on both main surfaces of the primary blade 331, the motor 8 can reduce not only wind noise to leak from the motor 8 via the inlet holes 27 and the outlet holes 28 but also wind noise to leak from the motor 8 via the outlet opening 25.

As described above, since the fan 33 of the motor 8 according to Embodiment 8 includes no secondary blade on both main surfaces of the primary blade 331, the motor 8 can reduce not only wind noise to leak from the motor 8 via the inlet holes 27 and the outlet holes 28 but also wind noise to leak from the motor 8 via the outlet opening 25. This configuration can make the motor 8 quieter.

Embodiment 9

Figure 15:
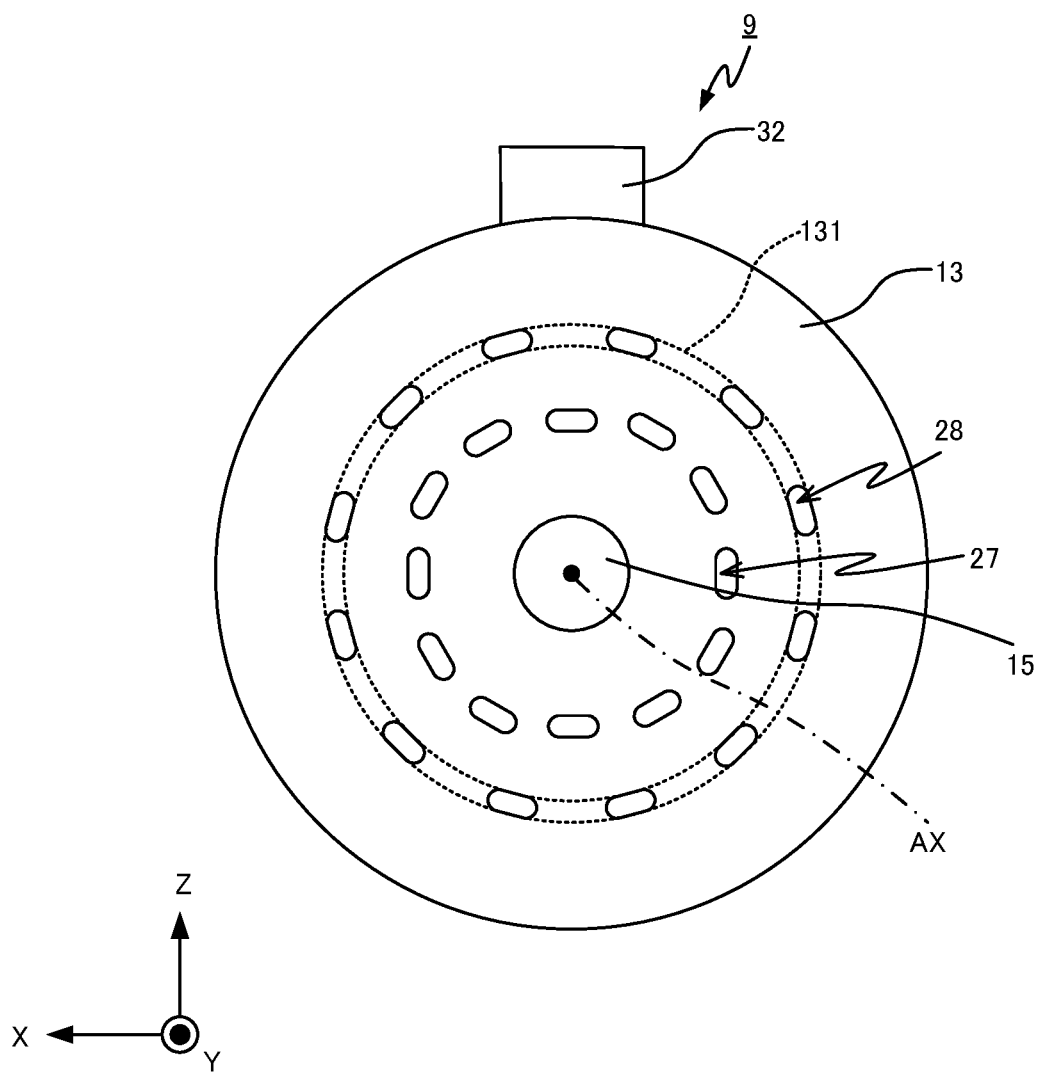
FIG. 15 is a side view of the motor according to Embodiment 9.

The bracket 13 may have any shape that is located in the vicinity of the fan 33 and suppress foreign materials contained in the ambient air from coming into contact with the components, such as the rotor conductor 19 and the stator conductor 21. The following description is directed to an example as Embodiment 9 in which the edge of the fan 33 is located inside a groove provided on the bracket 13. The bracket 13 of an electric motor 9 according to Embodiment 9 illustrated in FIG. 14 is provided with a groove 131. As illustrated in FIG. 15, which is a view of the motor 9 as seen toward the negative side in the Y-axis direction, the groove 131 has an annular shape around the central axis coinciding with the rotational axis AX. The inlet holes 27 are disposed around the rotational axis AX while being spaced in the circumferential direction. The outlet holes 28 are also disposed around the rotational axis AX while being spaced in the circumferential direction. As illustrated in FIG. 14, the edge of the fan 33 is located inside the groove 131.

The fan 33 rotates integrally with the shaft 15 in response to energization of the motor 9 having the above configuration, thereby introducing the air outside the motor 9 via the inlet holes 27. The ambient air entering through the inlet holes 27 flows in the vicinity of the bearing 22, flows outward in the radial direction along the fan 33, and exits the motor 9 through the outlet holes 28. The ambient air entering through the inlet holes 27 flows in the vicinity of the bearing 22 and can thereby cool the bearing 22.

As described above, since the edge of the fan 33 of the motor 9 according to Embodiment 9 is located inside the groove 131, the configuration can suppress foreign materials contained in the ambient air entering the motor 9 through the inlet holes 27 from coming into contact with the components, such as the rotor conductor 19 and the stator conductor 21. The motor 9 is therefore less susceptible to failures caused by foreign materials coming into contact with the components, such as the rotor conductor 19 and the stator conductor 21.

The above-described embodiments are not intended to limit the scope of the present disclosure. The above-mentioned position of the inlet opening 24 is a mere example, and the inlet opening 24 may also be provided in the bracket 14. The air-sending device disposed outside the motors 1 to 9 may be a fan to rotate in accordance with the rotation of the shaft 15. Although the motors 1 to 9 in the above-described embodiments are of an inner-rotor type in which the rotor 16 is disposed on the inner side of the stator 17 in the radial direction, the motors according to the embodiments of the present disclosure may also be of an outer-rotor type in which a rotor is disposed outwardly of a stator in the radial direction.

The guide 29 may have any shape that suppresses the ambient air entering through the inlet holes 27 from coming into contact with the stator 17 and the rotor 16. For example, the guide 29 may have a curved surface swelling outward in the radial direction.

The primary blade 331 may have any shape that suppresses the ambient air entering through the inlet holes 27 from coming into contact with the stator 17 and the rotor 16.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST 1, 2, 3, 4, 5, 6, 7, 8, 9 Electric motor
11 Frame
12 Stator frame
13, 14 Bracket
15 Shaft
16 Rotor
17 Stator
18 Rotor core
19 Rotor conductor
20 Stator core
21 Stator conductor
22, 23 Bearing
24 Inlet opening
25 Outlet opening
26, 33 Fan
27 Inlet hole 28 Outlet hole
29 Guide
31 Duct
32 Air passage
32 Cover
131 Groove
261, 331 Primary blade
262, 264, 332, 333 Secondary blade
263 Second uneven portion
291 First uneven portion
331a Curved portion
331b Edge portion
AX Rotational axis

The invention claimed is:

1. An electric motor, comprising:
a shaft supported to be rotatable about a rotational axis;
a rotor disposed outwardly of the shaft in a radial direction and configured to rotate integrally with the shaft;
a stator facing the rotor with a spacing therebetween in the radial direction;
bearings to support the shaft such that the shaft is rotatable;
a fan to rotate integrally with the shaft;
a frame including a stator frame having a shape of a cylinder and a pair of brackets closing ends of the stator frame, the frame being configured to accommodate the rotor, the stator, and the fan, and retain the bearings; and
a guide disposed outwardly of the fan in the radial direction, wherein
the stator frame has, at a portion including a top end in a vertical direction, an inlet opening to allow ambient air to flow into an inside of the motor and an outlet opening to allow the ambient air entering through the inlet opening to flow out to an outside of the motor,
the frame comprises at one of the brackets:
  inlet holes disposed in a surface facing the fan in a direction of the rotational axis, the inlet holes being configured to allow ambient air to flow into an inside of the electric motor; and
  outlet holes disposed outwardly of the inlet holes in the radial direction in the surface facing the fan in the direction of the rotational axis, the outlet holes being configured to allow the ambient air entering through the inlet holes to flow out to an outside of the electric motor,
the guide has a shape for suppressing foreign materials contained in the ambient air entering through the inlet holes from coming into contact with the stator and the rotor,
an edge of the fan in the radial direction faces an edge of the guide in the direction of the rotational axis,
the guide is disposed outwardly of the outlet holes in the radial direction in the surface of the one of the brackets facing the fan in the direction of the rotational axis, and extends towards the edge of the fan in the radial direction, and
the guide allows the ambient air entering through the inlet holes to flow toward the outlet holes, and allows the ambient air entering through the inlet opening to flow through a gap between the rotor and the stator and flow toward the outlet opening.

2. The electric motor according to claim 1, wherein the guide is mounted on the frame, extends toward the edge of the fan in the radial direction, and has a shape for suppressing the foreign materials contained in the ambient air entering through the inlet holes from flowing through a gap between the fan and the guide.

3. The electric motor according to claim 2, wherein the edge of the fan in the radial direction is disposed outwardly of the outlet holes in the radial direction and located in vicinity of the frame.

4. The electric motor according to claim 3, wherein
the frame comprises an annular groove in the surface facing the fan around a central axis coinciding with the rotational axis, and
the edge of the fan in the radial direction is located inside the groove.

5. The electric motor according to claim 4, wherein
the fan comprises:
  a primary blade mounted on the shaft and having a circular profile in a section orthogonal to the rotational axis; and
  at least one secondary blade extending from the primary blade.

6. The electric motor according to claim 3, wherein
the fan comprises:
  a primary blade mounted on the shaft and having a circular profile in a section orthogonal to the rotational axis; and
  at least one secondary blade extending from the primary blade.

7. An electric motor, comprising:
a shaft supported to be rotatable about a rotational axis;
a rotor disposed outwardly of the shaft in a radial direction and configured to rotate integrally with the shaft;
a stator facing the rotor with a spacing therebetween in the radial direction;
bearings to support the shaft such that the shaft is rotatable;
a fan to rotate integrally with the shaft;
a frame having a shape of a cylinder having closed ends, the frame being configured to accommodate the rotor, the stator, and the fan, and retain the bearings; and
a guide disposed outwardly of the fan in the radial direction, wherein
the frame comprises:
  inlet holes disposed in a surface facing the fan in a direction of the rotational axis, the inlet holes being configured to allow ambient air to flow into an inside of the electric motor; and
  outlet holes disposed outwardly of the inlet holes in the radial direction in the surface facing the fan in the direction of the rotational axis, the outlet holes being configured to allow the ambient air entering through the inlet holes to flow out to an outside of the electric motor,
the guide has a shape for suppressing foreign materials contained in the ambient air entering through the inlet holes from coming into contact with the stator and the rotor, and
an edge of the fan in the radial direction faces an edge of the guide in the direction of the rotational axis, wherein
the edge of the guide facing the fan comprises a first uneven portion comprising alternately arranged recesses and protrusions, the recesses being recessed in the direction of the rotational axis, the protrusions protruding in the direction of the rotational axis,
the edge of the fan in the radial direction facing the guide comprises a second uneven portion comprising alternately arranged recesses and protrusions, the recesses being recessed in the direction of the rotational axis, the protrusions protruding in the direction of the rotational axis, and the first uneven portion and the second uneven portion face each other in the direction of the rotational axis and thereby define a labyrinth channel therebetween.

8. The electric motor according to claim 1, wherein the fan comprises:
a primary blade mounted on the shaft and having a circular profile in a section orthogonal to the rotational axis; and
at least one secondary blade extending from the primary blade.

9. The electric motor according to claim 2, wherein the fan comprises:
a primary blade mounted on the shaft and having a circular profile in a section orthogonal to the rotational axis; and
at least one secondary blade extending from the primary blade.

10. The electric motor according to claim 7, wherein the edge of the fan in the radial direction is disposed outwardly of the outlet holes in the radial direction and located in vicinity of the frame.

11. The electric motor according to claim 10, wherein the frame comprises an annular groove in the surface facing the fan around a central axis coinciding with the rotational axis, and
the edge of the fan in the radial direction is located inside the groove.

12. The electric motor according to claim 11, wherein the fan comprises:
a primary blade mounted on the shaft and having a circular profile in a section orthogonal to the rotational axis; and
at least one secondary blade extending from the primary blade.

13. The electric motor according to claim 10, wherein the fan comprises:
a primary blade mounted on the shaft and having a circular profile in a section orthogonal to the rotational axis; and
at least one secondary blade extending from the primary blade.

14. The electric motor according to claim 7, wherein the fan comprises:
a primary blade mounted on the shaft and having a circular profile in a section orthogonal to the rotational axis; and
at least one secondary blade extending from the primary blade.

15. An electric motor, comprising:
a shaft supported to be rotatable about a rotational axis;
a rotor disposed outwardly of the shaft in a radial direction and configured to rotate integrally with the shaft;
a stator facing the rotor with a spacing therebetween in the radial direction;
bearings to support the shaft such that the shaft is rotatable;
a fan to rotate integrally with the shaft;
a frame having a shape of a cylinder having closed ends, the frame being configured to accommodate the rotor, the stator, and the fan, and retain the bearings; and
a guide disposed outwardly of the fan in the radial direction, wherein
the frame comprises:
inlet holes disposed in a surface facing the fan in a direction of the rotational axis, the inlet holes being configured to allow ambient air to flow into an inside of the electric motor; and
outlet holes disposed outwardly of the inlet holes in the radial direction in the surface facing the fan in the direction of the rotational axis, the outlet holes being configured to allow the ambient air entering through the inlet holes to flow out to an outside of the electric motor,
the guide has a shape for suppressing foreign materials contained in the ambient air entering through the inlet holes from coming into contact with the stator and the rotor, and
an edge of the fan in the radial direction faces an edge of the guide in the direction of the rotational axis, wherein the edge of the fan in the radial direction is disposed outwardly of the outlet holes in the radial direction and located in vicinity of the frame.

16. The electric motor according to claim 15, wherein the frame comprises an annular groove in the surface facing the fan around a central axis coinciding with the rotational axis, and
the edge of the fan in the radial direction is located inside the groove.

17. The electric motor according to claim 16, wherein the fan comprises:
a primary blade mounted on the shaft and having a circular profile in a section orthogonal to the rotational axis; and
at least one secondary blade extending from the primary blade.

18. The electric motor according to claim 15, wherein the fan comprises:
a primary blade mounted on the shaft and having a circular profile in a section orthogonal to the rotational axis; and
at least one secondary blade extending from the primary blade.

* * * * *